United States Patent [19]
Beaman

[11] 3,709,279
[45] Jan. 9, 1973

[54] TIRE CHANGING MACHINE ADAPTER

[76] Inventor: Clayton E. Beaman, P.O. Box 371, Wilson, N.C. 27893

[22] Filed: Aug. 5, 1971

[21] Appl. No.: 169,361

[52] U.S. Cl.................................157/1.24, 144/288 A
[51] Int. Cl................................................B60c 25/06
[58] Field of Search..........157/1, 1.1, 1.17, 1.2, 1.22, 157/1.24, 1.26, 1.28; 144/244 A

[56] References Cited

UNITED STATES PATENTS

| 1,538,875 | 5/1925 | Stevens | 157/1.24 |
| 3,003,544 | 10/1961 | Foster | 157/1.26 |
| 3,648,746 | 3/1972 | Beaman | 157/1.24 |

*Primary Examiner*—Granville Y. Custer, Jr.
*Attorney*—Clarence A. O'Brien et al.

[57] ABSTRACT

A hand wheel shaped body including a central tubular hub portion projecting endwise outwardly from one side thereof and provided with internal threads for threaded engagement with the abbreviated threads on the hold-down post of a tire changing machine.

7 Claims, 4 Drawing Figures

PATENTED JAN 9 1973

3,709,279

Clayton E. Beaman
INVENTOR.

BY Clarence A.O'Brien
and Harvey B. Jacobson
Attorneys

TIRE CHANGING MACHINE ADAPTER

The adapter of the instant invention comprises a modification of the tire changing machine adapter disclosed in my copending U. S. application Ser. No. 72,751, filed Sept. 16, 1970, for Custom Wheel Adapter for Tire Changing Machine, now U.S. Pat. No. 3,648,746, issued Mar. 14, 1972.

The adapter of the instant invention comprises a body in the general shape of a hand wheel having a central hub portion projecting outwardly from one side thereof and the inside of the hub portion is threaded for engagement with a hold-down post of a tire changing machine.

Since most present day tire changing machines were designed, custom wheel rims have increased in width and include cylindrical hub portions which project outwardly to the outside of the medial plane of the wheels. These custom wheels, when placed on conventional tire changing machines with the outer sides of the wheels facing upwardly and the hold-down post of the tire changing machine received through the central hub portion of the wheel, have the upper or outer end of their hub portions disposed above the threads on the hold-down post of the associated tire changing machine, thus necessitating that an adapter threadedly engaged with the hold-down post must include a hub portion capable of reaching down into the center hub portion of the custom wheel to be secured to the tire changing machine.

The adapter disclosed in my copending application has been specifically designed throughout to provide such hold-down adapter. However, my previous hold-down adapter was engineered from beginning to end to accomplish its intended function and thus utilizes no components which are readily available on the open market.

On the other hand, the tire changing machine adapter of the instant invention has been constructed to utilize an existing component, a threaded sleeve, so as to reduce the initial cost of manufacture of the desired hold-down adapter.

The threaded sleeve component of the hold-down adapter of the instant invention is, however, somewhat shorter than desired and accordingly, the threaded sleeve is not secured to the body of the hand wheel in a conventional manner with the non-projecting end of the sleeve flush with the associated side of the hold-down wheel. To the contrary, one end of the sleeve is recessed within one side of the hold-down adapter forming hand wheel in order to enable the sleeve, which is of a length shorter than required, to provide the necessary reach down into the hub of a custom wheel being mounted on a tire changing machine.

The main object of this invention is, therefore, to provide a tire changing machine adapter designed specifically to handle deep dish custom wheels with extended hub portions and yet enable the utilization of a readily available component in the construction of the adapter.

A further object of this invention is provide a tire changing machine adapter including a frusto-conical outer portion for engagement with the center hub portion of an associated wheel whereby the adapter will be able to be utilized in conjunction with wheels having center hub portions of different diameters.

A final object of this invention to be specifically enumerated herein is to provide a wheel hold-down adapter for tire changing machines in accordance with the preceding objects and which will conform to conventional forms of manufacture, be of simple construction and easy to use, so as to provide a device that will be economically feasible, long-lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
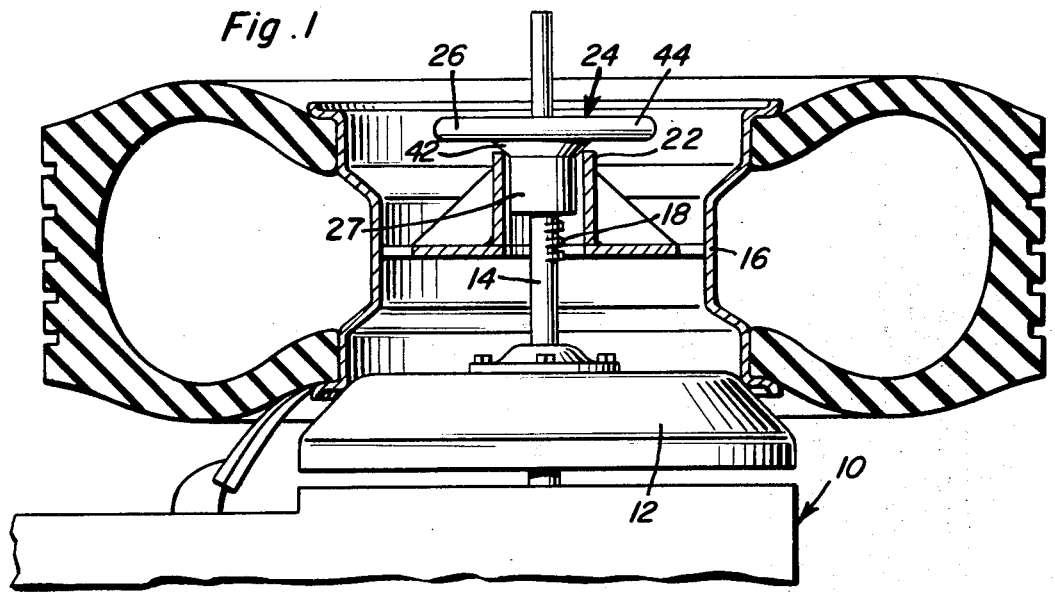
FIG. 1 is a fragmentary side elevational view of the upper portion of a conventional tire changing machine, such as the Mark V model Big Four tire changing machine with a deep dish wheel disposed thereon and the adapter of the instant invention in operative position holding the wheel on the tire changing machine.
Figure 2:
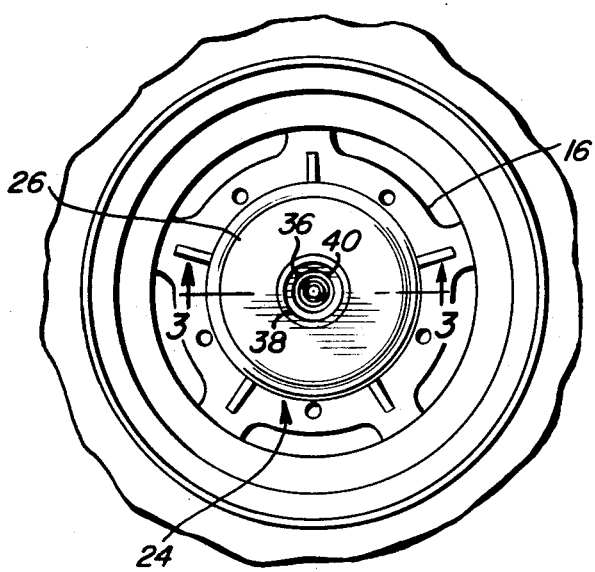
FIG. 2 is a fragmentary top plan view of the assemblage illustrated in FIG. 1.

Referring now more specifically to the drawings, the numeral 10 generally designates a Big Four tire changing machine. The machine 10 includes an upper central portion 12 from which an upstanding rotary hold-down post 14 projects. The central portion 12 is adapted to have the underside periphery of a horizontally disposed vehicle wheel, such as the wheel 16, supported therefrom in the manner illustrated in FIG. 1 of the drawings and the post 14 includes abbreviated threads 18 which terminate upwardly a distance spaced considerably below the upper end 20 of the hub 22 of the wheel 16, see FIG. 3.

Figure 3:
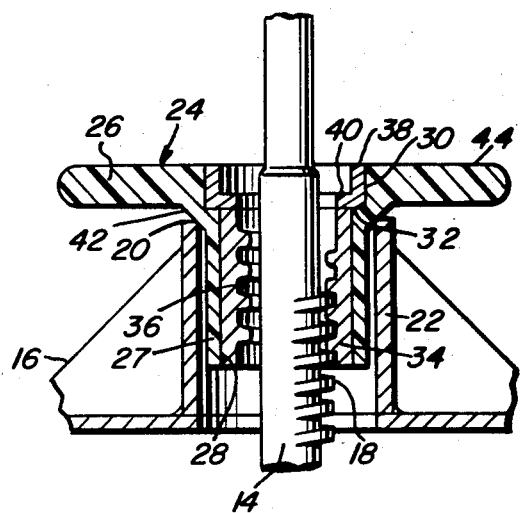
FIG. 3 is an enlarged fragmentary vertical sectional view taken substantially upon the plane indicated by the section line 3—3 of FIG. 2.
Figure 4:
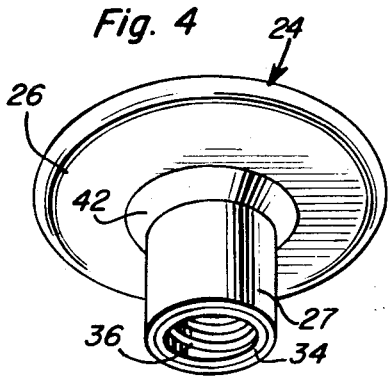
FIG. 4 is a perspective view of the adapter of the instant invention.

With reference now more specifically to FIG. 3 of the drawings, it may be seen that the wheel adapter of the instant invention is referred to in general by the reference numeral 24. The adapter 24 includes a hand wheel defining body 26 constructed of molded fiber glass or the like (although metal can be used) and the body 26 includes an integral endwise outwardly projecting hub portion 27 which extends from one side of the body 26 (the lower side in FIG. 3). A bore 28 is formed through the hub portion 27 and is concentric with the latter. The end of the bore 28 passing through the body 26 includes a diametrically enlarged counterbore 30, and a radially extending shoulder 32 is defined at the inner end of the counterbore 30. A metal sleeve 34 is provided and secured within the bore 28 in any convenient manner. The sleeve 34 includes inner threads 36 for threaded engagement with the threads 18 on the post 14 and it will be noted that the length of the sleeve 34 is shorter than the total length of the bore 28 and the counterbore 30. However, the sleeve 34 is commercially available in this length and in order to enable the sleeve 34 to be rigidly secured within the body 26 against longitudinal shifting in a downward direction, as viewed in FIG. 3 of the drawings, a collar 38 is provided and seatingly secured in the counterbore 30 against the shoulder 32. The collar 38 includes a circumferentially extending and radially inwardly projecting flange 40 which overlies the upper end of the sleeve 34 and to which the latter is secured, prior to assembly of the sleeve within the body 26, in any convenient manner, such as by welding (not shown). The collar 38 and the sleeve 34 are constructed of metal whereby the two pieces may be conveniently welded together and the utilization of the collar 38 to secure the sleeve 34 within the hub portion 27 enables the sleeve 34 to reach downward in the hub portion 27 to the lower end thereof whereby the sleeve 34 may reach down to and be threadedly engaged with at least the upper three convolusions of threads 18.

The body 26 further includes an inverted frusto-conical outer surface 42 which extends between and connects the undersurface of the upper hand wheel defining portion 44 of the body 26 to the outer surfaces of the upper end of the hub portion 27 of the body 26. In this manner, the surface 42 may be engaged with the upper end 20 of wheel hubs 22 of different diameters.

Accordingly, when it is desired to mount the wheel 16 on the machine 10, the wheel 16 is placed on the upper central portion 12 of the machine 10 in the manner illustrated in FIG. 1 of the drawings, with the post 14 projecting upwardly through the hub 22 of the wheel 16. Thereafter, the adapter 24 is slipped downward over the upper end of the post 14 and rotated in a clockwise direction as viewed from above so as to engage the threads 36 with the threads 18 and screw the adapter 24 downward on the post 14 to a position with the surface 42 engaging the upper end 20 of the hub of the wheel 22 so as to retain the latter in stationary position on the upper central portion 12 of the machine 10. Of course, when it is desired to remove the wheel 16, the above steps are substantially reversed.

Because of the frusto-conical shape of the surface 42, the adapter 24 may be used on wheels having center hubs of different inside diameters. In addition, inasmuch as the sleeve 24 is recessed downwardly below the medial plane of the body 26, as illustrated in FIG. 3 of the drawings, the lowest reach of the sleeve 34 is increased so as to insure that a sufficient number of the threads 18 will be engaged by the threads 36 when the adapter 24 is utilized on a wheel, such as the wheel 16.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A wheel hold-down adapter for use on the center hold-down post of a tire changing machine, said adapter comprising a body defining a hand wheel, said body including a central endwise outwardly projecting generally cylindrical hub portion on one side of said hand wheel, said hub portion having a bore extending therethrough and also through said body, the end of said bore opening through the other side of said body, including a counterbore, an internally threaded sleeve secured in said bore and having one end thereof recessed inwardly relative to said other side of said body, and a collar seated in said counterbore and to which the adjacent end of said sleeve is secured.

2. The combination of claim 1 wherein said body is constructed of fiber glass and said hub portion and collar are constructed of metal.

3. The combination of claim 2 wherein said sleeve is welded to said collar.

4. The combination of claim 1 wherein said collar includes an inner end radially inwardly projecting peripheral flange seated in said counterbore, said one end of said sleeve being secured to the adjacent side of said flange.

5. The combination of claim 1 wherein said body includes a frusto-conical surface joining the side surfaces of said hand wheel on said one side thereof with the adjacent outer surface portions of said hub portion, said frusto-conical surface being tapered toward the outer end of said hub portion.

6. The combination of claim 5 wherein said body is constructed of fiber glass and said hub portion and collar are constructed of metal.

7. The combination of claim 6 wherein said sleeve is welded to said collar.

* * * * *